United States Patent [19]
Bayard

[11] 4,150,879
[45] Apr. 24, 1979

[54] SOLID DRY ELECTROCHROMIC DISPLAY

[75] Inventor: Michel L. Bayard, 6614 Lake Circle Dr., Dallas, Tex. 75261

[73] Assignee: Texas Instruments Incorporated, Dallas, Tex.

[21] Appl. No.: 741,320

[22] Filed: Nov. 12, 1976

[51] Int. Cl.² .............................................. G02F 1/00
[52] U.S. Cl. ..................................................... 350/357
[58] Field of Search ........................... 350/160 R, 357; 340/324 M, 336; 252/408, 518

[56] References Cited
U.S. PATENT DOCUMENTS

| | | | |
|---|---|---|---|
| 3,998,525 | 12/1976 | Giglia | 350/160 R |
| 4,009,936 | 3/1977 | Kasai | 350/160 R |

*Primary Examiner*—Stanley D. Miller, Jr.
*Assistant Examiner*—James W. Davie

[57] ABSTRACT

A totally dry solid electrochromic display cell comprising a tungsten oxide display electrode, a ceramic-like ion conductive electrolyte of a sodium zirconium silicon phosphoric oxide electrolyte and a counter electrode of a sodium "bronze" having a metallic coating.

6 Claims, 3 Drawing Figures

SOLID DRY ELECTROCHROMIC DISPLAY

This invention relates to electrochromic devices and more particularly to electrode-electrolyte systems for use as electrochromic information display devices. p Electrochromic devices may be described as devices in which a chemical change produced in response to the controlled application of an electric field results in a change in the reflective or transmissive properties of the device with respect to electromagnetic radiations. In information display devices using this property, the change is usually manifested as changes in color at selected shaped electrodes of the device so that there are displayed a number of alphanumeric characters to convey the information. In one class of known devices, inorganic materials are used for all of the active elements of the cell which usually comprise at least two electrodes, an electrolyte and at times an insulator. In such a cell, one or both of the electrodes are of an electrochromic material. According to one theory of operation, applying an electrical potential across the electrodes causes ions present in the electrolyte to be adsorbed by one of the electrodes producing a change in color or transmissivity of that electrode. In most information displays, the change in color remains after removal of the electrical potential. Reversing the current in the circuit reverses the chemical reaction and the changed electrode then reverts to its original condition. Thus, it is the function of the electrolyte to supply or transport ions in the system.

Inorganic systems of the prior art have used tungsten oxide ($WO_3$) or vanadium oxide ($V_2O_5$) as display electrodes together with an electrolyte such as sulphuric acid or an aqueous salt solution and a metallic counter-electrode. Upon application of the electric field, hydrogen or metal ions in the electrolyte are attracted to the display electrode and form tungsten or vanadium "bronzes" on the electrode to produce a blue color.

The construction of such a display cell involves problems in dealing with a liquid electrolyte such as the means required for sealing the electrolyte within the cell and leakages which can be the result of thermal or physical shocks or stresses. The requirement of adequately sealing the electrolyte, which may be very active chemically, within the cell adds to the expense of manufacture of the device.

Prior art attempts to overcome such problems have been directed to immobilizing the liquid electrolyte, such as by supporting it in jells, membranes or matrixes. However, such systems still involve a "wet" electrolyte with associated problems and costs.

The present invention provides a totally dry solid electrochromic display cell through the use of a solid ceramic-like electrolyte material wherein sodium ions are readily conducted or transported through the electrolyte, but "electronic" conduction is negligible. In such a system, the display electrode may be of tungsten oxide, the solid electrolyte may be a ceramic plate ionic conductor which is a member of the series of $Na_{1+x}Zr_2Si_xP_{3-x}O_{12}$ where x is from 0.8 to 2.4 and the counter-electrode may be a sodium "bronze" $Na_yWO_3$ where y is about 0.3.

It is one object then of the present invention to provide a completely dry and solid electrochromic display cell.

It is a further object of the present invention to provide a new electrochromic display cell of more rugged construction than systems of the prior art.

It is a still further object of the present invention to provide an electrochromic display cell which is more easily and inexpensively constructed than those of the prior art.

These and other objects and advantages of the present invention will become apparent from the following detailed description when read with reference to the accompanying drawing in which.

Figure 1:
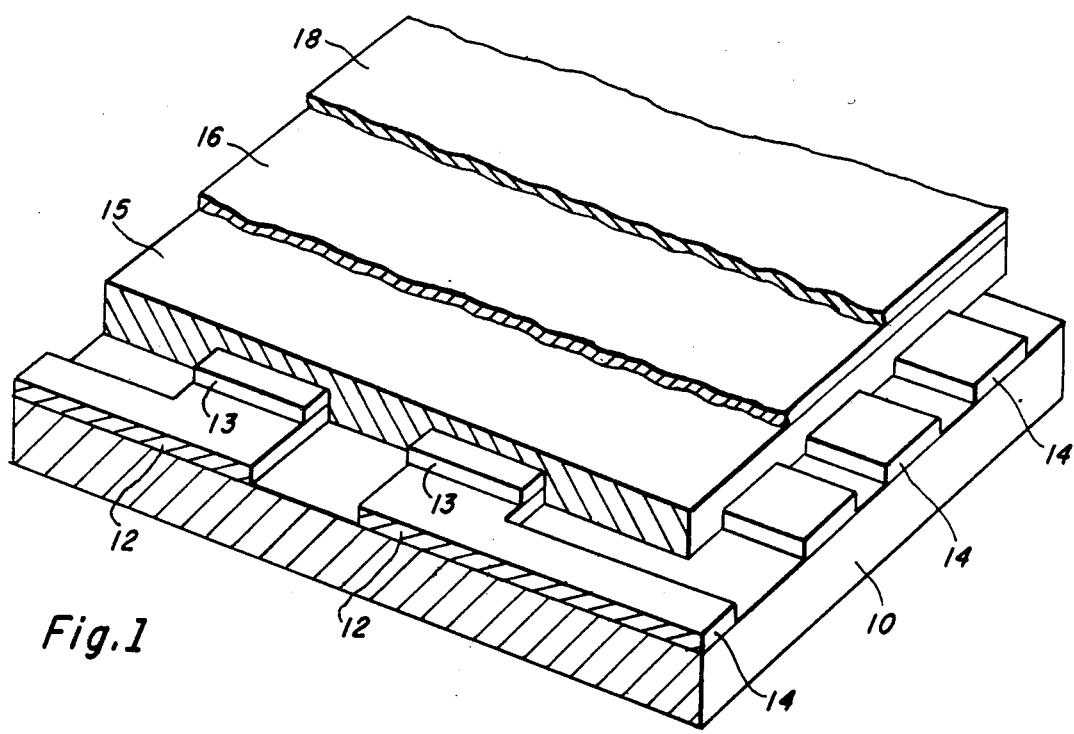
FIG. 1 is a sectional partially cutaway view illustrating one embodiment of the present invention.

Referring now to FIG. 1 the electrochromic display cell of the present invention comprises a transparent front panel 10 of glass or suitable plastic which may be thick enough to provide structural support for the remaining elements of the cell. On the back surface of the front panel, there has been deposited, such as by plasma deposition, a pattern of transparent electrically conductive regions 12 of a material such as tin oxide or indium oxide. These regions are in the shape of the digit display segments, their respective electrical leads, and the external contacts as is well known in the art. Of course, other transparent conductive coatings or thin metallic platings may be used. Thereafter, a thin layer of an electrochromic material such as tungsten oxide or vanadium oxide is applied by evaporative deposition or other suitable process to form the display segment regions 13 on the transparent coating 12. This electrochromic material coating may be applied to a thickness of approximately 1 micron. Such materials are essentially transparent with a slight yellow tint, but as is well known, form "bronzes" when reacted with certain ions such as sodium ions and become opaque or blue or blue-black in color. A thin insulating coating such as silicon oxide (not shown) may be applied over the "lead" portions of the tin oxide coating connecting the display segments to their respective external contact regions 14. These contact regions may have applied to them an added metallic coating such as gold or silver to provide good electrical contact to the internal electrodes of the cell. The insulative coating protects the tin oxide leads from electrochemical action in the cell which could produce a coating of sodium on these leads if they are not protected.

Next there is applied a layer 15 of a dry solid electrolyte material which is conductive to sodium ions but electrically insulative. Such a material is a ceramic-like electrolyte which is a member of the series $Na_{1+x}Zr_2Si_xP_{3-x}O_{12}$ where x is from 0.8 to 2.4. Such a material may be evaporated onto the structure to produce a layer 15 covering all the previously deposited materials with the exception of the external "lead" areas 14. A particular electrolyte found satisfactory is $Na_3Zr_2Si_2PO_{12}$.

Next there is deposited over the electrolyte layer 15 a counter-electrode layer 16 of a sodium "bronze" such a $Na_yWO_3$ where y is approximately equal to 0.3. Such a material may be deposited by evaporation from a tungsten boat.

Finally a metallic layer 18 such as gold, copper or silver is applied over the counter-electrode to provide good electrical contact thereto.

A display cell such as that shown in FIG. 1 has the advantage of being a completely dry solid cell which is very little thicker than the glass substrate on which it is built inasmuch as the various layers each need be only approximately one micron thick or a total thickness in addition to that of the glass of only about five microns. Simple construction techniques make such cells very inexpensive when compared with other types of electrochromic displays. Further such cells are adapted to larger and smaller sizes than previous cells using "wet" electrolytes. It has been found that such a display can be turned on and off reversibly in about two seconds with a difference of potential of only five volts between the electrodes.

Figure 2:
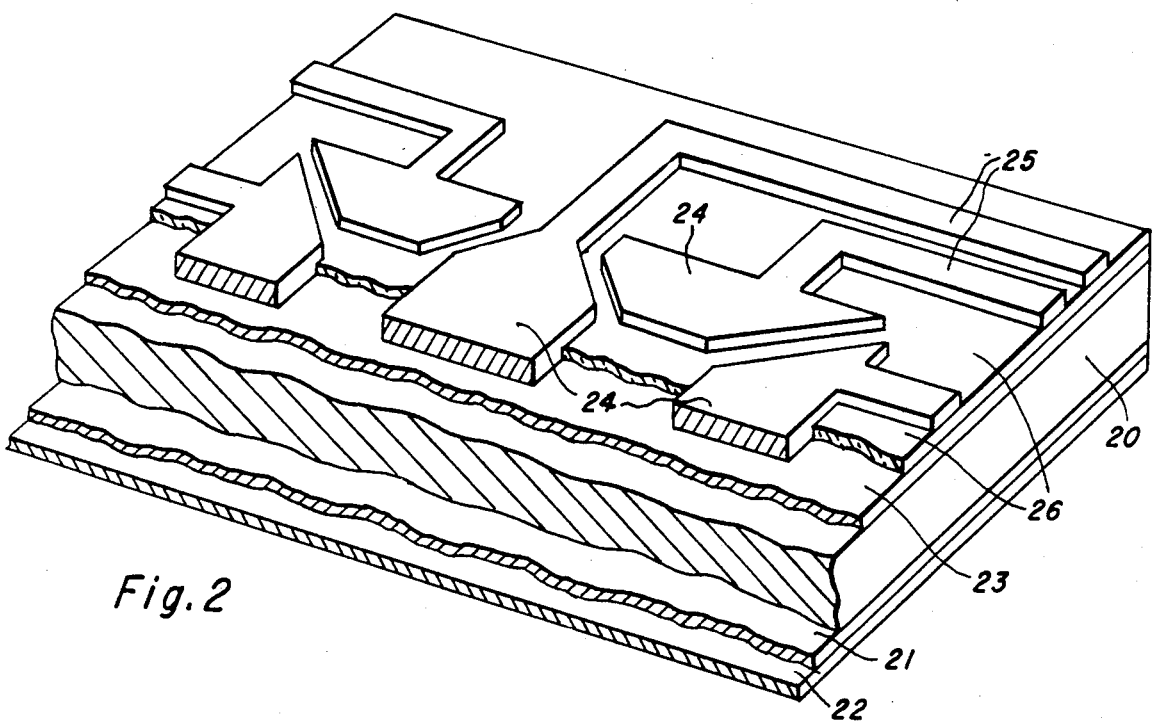
FIG. 2 is a sectional partially cutaway view illustrating a second embodiment of the present invention.
Figure 3:
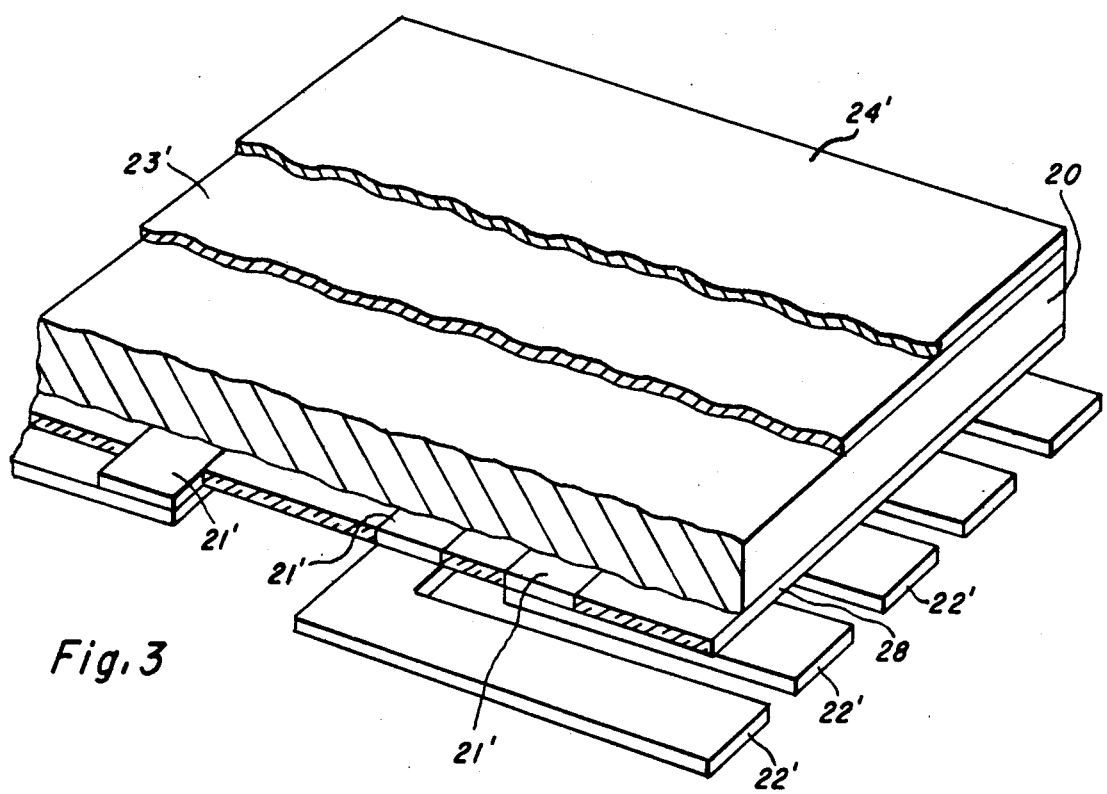
FIG. 3 is a sectional partially cutaway view illustrating a third embodiment of the present invention.

The embodiments of FIGS. 2 and 3 are unique in since the dry electrolyte used for the electrochromic cells of FIGS. 2 and 3 has the properties of a strong ceramic material and it is thus used as the structural substrate on which are deposited the other elements of the cell.

In both FIGS. 2 and 3 substrate 20 is comprised of a plate of a material which is a member of the series $Na_{1+x}Zr_2Si_xP_{3-x}O_{12}$ to act as a solid dry electrolyte which is electrically insulative but is conductive of sodium ions. The substrate is of a thickness to supply the desired strength and rigidity for a display cell, preferably on the order of from about 0.5 to 1 mm. thick. Such a "plate" may be prepared as described in "Fast Na+-ion Transport in Skeleton Structures" by J. B. Goodenough, H. Y-P Hong, and J. A. Kafalas, Mat. Res. Bull., Volume 11, 1976, pages 203–220. Next to the substrate electrolyte on the front side of the display is a thin display electrode layer 21 of a material such as tungsten oxide ($WO_3$) for example. A transparent electrically conductive layer 22, such as $SnO_2$ is applied over the electrode layer 21.

On the opposite or back side of the substrate 20, there is applied a counter-electrode layer 23 which must be capable of acting as the ion source for the cell. A suitable material for the counter-electrode layer 23 is a sodium "bronze" having the general formula $Na_yWO_3$ where y is approximately 0.3. Over the counter-electrode layer 23 there are applied metallic regions 24 in patterns in the form to produce the type of display desired. For example, to produce a numeric display the metallic regions would be arranged in the well-known seven-segment pattern for each digit of the display. The metallic regions 24 may be of any good electrical conductor, such as gold, silver or copper. An insulation layer 26 such as silicon dioxide, is applied to the portions of the counter-electrode layer 23 not contacted by the metal regions 24. Additional metal regions 25 are laid down over the insulation layer and in contact with the patterned metal regions 24 to act as electrical contacts for those regions. Finally, a thin transparent insulating protective coating (not shown), such as silicon dioxide, may be applied to all surfaces of the cell except for the contact areas of the metal leads 25 which may be along two edges of this cell.

A display cell of the type just described when seen from the viewing side (bottom in FIG. 2) shows a single color surface with no indication or outline of the digit segments usually visible in such display cells. Yet, when voltage is applied between the leads 25 of selected metal segments 24 and the conductive coating 22, sodium ions from the substrate electrolyte are injected into the tungsten oxide layer 21 in areas directly opposite the energized segments 24 and in the shape of these segments to produce areas in layer 21 of sodium "bronze" of a sharply contrasting color. Colored digits are thus selectively produced in the display. It has been found that a display of this type can be turned "on" by application of a voltage of approximately 5 l volts for about one second. The cell will remain in the "on" condition even after the bias voltage has been removed until a voltage of about the same magnitude but of opposite polarity is applied whereupon the display reverts to its "off" condition and the colored digit disappears.

Although the display cell of FIG. 2 produces excellent definition of the displayed characters, it has been found that even sharper character definition can be obtained in a cell wherein the tungsten oxide layer and its transparent electrical contact are divided into patterned regions and the counter-electrode and its electrical contact are made as single continuous layers. Such a cell is shown in FIG. 3 wherein the substrate 20 is of the same electrolyte material, the counter-electrode regions 21' are patterned into display segments which are each separately energized by patterned transparent conductive regions 22'. As in the cells previously described, the electrode regions 21' are of tungsten oxide ($WO_3$) and the transparent contacts 22' may be of $SnO_2$. Of course, the layers 22' should be insulated from contact with the substrate 20 as by a thin layer 28 of $SiO_2$. Counter-electrode layer 23' may be of sodium "bronze" ($Na_{0.3}WO_3$) with electrical contact provided by conductive layer 24' which may be of gold, silver, copper or other suitable metal.

Thus there has been disclosed a completely dry and solid electrochromic display cell structure which in some embodiments can be so constructed that the supporting substrate structure of the cell is also one of the functional elements of the cell. Many changes and modifications still within the spirit and scope of the electrochromic cell of the present invention will occur to those skilled in the art and thus this invention is not to be limited to the embodiments herein disclosed but only as hereinafter claimed.

What is claimed is:

1. An electrochromic display cell comprising:
   a transparent front panel member of sufficient thickness to act as the structural support substrate of said cell,
   a plurality of display electrodes supported on and visible through said front panel and comprised of an oxide of tungsten or vanadium,
   a counter-electrode comprised of a sodium tungstate or vanadate;
   a dry solid electrolyte interposed between and contacting said display electrodes and said counter-electrode, said electrolyte being electrically insulating but conductive of sodium ions; and
   electrical contact means to each of said electrodes.

2. An electrochromic display cell as defined in claim 1 wherein said electrolyte is comprised of a material which is a member of the series $Na_{1+x}Zr_2Si_xP_{3-x}O_{12}$ and x is from 0.8 to 2.4.

3. An electrochromic display cell as defined in claim 2 wherein x is equal to 2.

4. An electrochromic display cell as defined in claim 1 wherein said display electrode is comprised of $WO_3$ and said counter-electrode is comprised of $Na_yWO_3$ and y is about 0.3.

5. An electrochromic display cell as defined in claim 4 wherein said electrolyte is comprised of a material which is a member of the series $Na_{1+x}Zr_2Si_xP_{3-x}O_{12}$ and x is from 0.8 to 2.4.

6. An electrochromic display cell as defined in claim 1 wherein said display electrode is comprised of $WO_3$, said counter-electrode is comprised of $Na_{0.3}WO_3$ and said electrolyte is comprised of $Na_3Zr_2Si_2PO_{12}$.

* * * * *